(12) United States Patent
Otte et al.

(10) Patent No.: US 7,054,361 B1
(45) Date of Patent: May 30, 2006

(54) METHOD AND APPARATUS FOR ENHANCING AN INFRARED SIGNAL PROTOCOL

(75) Inventors: Kurt William Otte, Indianapolis, IN (US); Barry Weber, Carmel, IN (US); Steven Charles Rhoads, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1003 days.

(21) Appl. No.: 09/585,803

(22) Filed: May 31, 2000

(51) Int. Cl.
*H03K 9/06* (2006.01)
*H03D 3/22* (2006.01)

(52) U.S. Cl. ...................................... 375/239; 375/333
(58) Field of Classification Search ................ 375/239, 375/280, 282, 237; 327/31; 341/50
See application file for complete search history.

(56) References Cited

U.S. PATENT DOCUMENTS

| | | | | |
|---|---|---|---|---|
| 4,231,031 A | * | 10/1980 | Crowther et al. ...... | 340/825.63 |
| 4,482,947 A | * | 11/1984 | Zato et al. ...................... | 700/9 |
| 4,636,052 A | * | 1/1987 | Bowsher ...................... | 396/57 |
| 4,855,905 A | | 8/1989 | Estrada et al. .............. | 364/200 |
| 5,185,766 A | * | 2/1993 | Cho ............................ | 375/333 |
| 5,189,543 A | | 2/1993 | Lin et al. ..................... | 359/142 |
| 5,204,768 A | | 4/1993 | Tsakiris et al. ............. | 359/148 |
| 5,282,028 A | | 1/1994 | Johnson et al. ............... | 358/86 |
| 5,455,570 A | | 10/1995 | Cook et al. ............. | 340/825.22 |
| 5,546,211 A | | 8/1996 | Devon ......................... | 359/154 |
| 5,550,548 A | * | 8/1996 | Schuermann ................ | 342/42 |
| 5,557,634 A | | 9/1996 | Balasubramanian et al. ........................... | 375/222 |
| 5,898,384 A | | 4/1999 | Alt et al. ................ | 340/825.36 |
| 5,917,631 A | | 6/1999 | Shafer ......................... | 359/142 |
| 5,958,081 A | | 9/1999 | Lemense et al. ............ | 714/811 |
| 5,977,822 A | | 11/1999 | Rybicki et al. | |
| 6,026,150 A | | 2/2000 | Frank et al. ............. | 379/90.01 |
| 6,542,149 B1 | * | 4/2003 | Chung ......................... | 345/158 |

FOREIGN PATENT DOCUMENTS

| DE | 4202782 A1 | 8/1992 |
|---|---|---|
| JP | 11-187075 | 7/1999 |
| WO | 97/26721 | 7/1997 |

OTHER PUBLICATIONS

Casier, H.J., A Pulse Position Modulation Transmission System for Remnote Control of a TV Set, IEEE Journal of Solid–State Circuits, Dec. 1976, vol. 11 Issue:6, page(s) 801–809.*

"Infrared Data Association Serial Infrared Physical Layer Specification"m Version 1.3, pp. I–39, Oct. 15, 1998.

* cited by examiner

*Primary Examiner*—Emmanuel Bayard
*Assistant Examiner*—Lawrence B. Williams
(74) *Attorney, Agent, or Firm*—Joseph S. Tripoli; Robert D. Shedd; Paul P. Kiel

(57) ABSTRACT

An apparatus and method for providing control signals, comprising a processor coupled to a memory, for generating a signal sequence. The processor encodes the signal sequence into a plurality of symbols using a 5 pulse position modulated (5 PPM) scheme. Advantageously, the last position of each symbol encoded under the 5 PPM scheme is set to a low bit. The symbol sequence represents a signaling protocol having a payload portion and a header portion, wherein the header portion comprises a plurality of fields for defining the payload portion. The payload portion indicates keyboard characters or coordinates for a pointing device.

14 Claims, 4 Drawing Sheets

METHOD AND APPARATUS FOR ENHANCING AN INFRARED SIGNAL PROTOCOL

BACKGROUND OF THE INVENTION

1. Field of Invention

The present invention relates to a transport protocol. More particularly, the invention relates to a transport protocol for communicating control signals from remote control devices, including an infrared keyboard and pointing device, to an electronic device.

2. Related Art

Set-top boxes are utilized by consumers for receiving multimedia signals from service providers such as satellite and cable. The set-top box is also capable of receiving signals from remote control devices, such as a television remote control, as well as a keyboard or pointing device. These remote devices allow a subscriber of services (user) to interface with the multimedia or computer software that is viewed on a display panel that is coupled to the set-top box. The keyboard and pointing device (e.g., mouse) interface with a processor in the set-top box via pulsed infrared (IR) signals. However, signal protocols used by such remote control devices, in particular infrared protocols, may not have enough flexibility to support the number of keycodes needed for a keyboard device, or the speed of transmissions necessary for a pointing device. Several off the shelf solutions are available to solve the problem with a range of protocols, however the majority of them are designed to interface with an additional designated processor, which is prohibitively expensive.

A current physical layer format utilizes a four pulse position modulation (4 PPM) data encoding technique prior to transmitting the infrared signal. The pulse position modulation encoding is achieved by defining a data symbol interval and subsequently subdividing the data symbol interval into equal time slices called "chips". In PPM schemes, each chip position within a data symbol represents one of the possible bit combinations. Logical "1" represents a chip interval when the transmitting light emitting diode (LED) is emitting light, while a logical "0" represents a chip interval when the LED is off. Thus, 4 PPM data encoding includes four chips corresponding to 4 equal time segments. For example, a symbol duration of 500 nsec has four 125 nsec chip intervals.

The following Table 1 correlates each data bit pair with a corresponding 4 PPM data sequence, or symbol.

TABLE 1

| Data Bit Pair (DBP) | 4 PPM Data Symbol |
| --- | --- |
| 00 | 1000 |
| 01 | 0100 |
| 10 | 0010 |
| 11 | 0001 |

Because there are four unique chip positions within each symbol in 4 PPM, four intervals exist in which only one chip is logically a "one" while all other chips are logically a "zero". As such, each symbol represents two data bits or a "data bit pair." In this manner, a packet containing illustratively 40 bits representing a letter, number, or command selected by a user on the keyboard, is represented by 20 symbols modulated onto a carrier and transmitted from a infrared serial port on the keyboard to the set-top box.

A problem with signal detection by a remote control receiver, particularly with regard to the 4 PPM scheme, has been observed when two infrared pulses occur back to back. For example, when data bit pairs 11 and 00 are sent sequentially such that the chip sequence is 00011000. This occurs in instances where hardware that generates interrupts is only capable of generating an interrupt on a rising edge or on a leading edge of an incoming signal, and does not know the length of the pulse. In such instances, the IR receiver encounters difficulty in distinguishing the symbols, which results in an increase in the bit error rate (BER). Thus, there is a need for an alternative format to the traditional IR formats for devices such as keyboards and pointing devices, which cannot be operated in the traditional format, such as the 4 PPM scheme. Furthermore, there is need for a transmission technique that improves the BER, and a format that operates without a dedicated IR receiver microprocessor.

SUMMARY OF INVENTION

The disadvantages heretofore associated with the prior art, are overcome by the present invention of a data structure comprising a header portion having a plurality of fields and an expandable payload portion, wherein the data structure utilizes a five pulse position modulation (5 PPM) technique for transmitting the header portion and the expandable payload portion. In a preferred embodiment, the last position of a 5 PPM signal is set to a "low" bit. Such an arrangement allows a receiver to decode the received PPM signal based on the rising edges of the pulses, without determining the length of the pulses, thereby allowing the receiver to be designed with fewer, and lower cost components. The inventive data structure can advantageously be used as an infrared signal protocol for remote control of remote control devices such as a wireless keyboard or pointing device.

The plurality of fields are distributed in a three-byte header and comprise a preamble, identification (ID), mode, power flag, reserved bit, repeat field, payload size and check sum. By setting all the bits in specific fields to a high state, the payload portion is expandable from 1 byte up to three bytes in length. The payload portion is used to carry scan codes and key flags for keyboards and X and Y coordinates for a pointing device.

Thus, the inventive IR signaling protocol allows an IR receiver's software to receive traditional IR signaling protocols, as well as providing time between packets for transmission of RF pulses from a RF remote device. Additionally, the data structure allows set-top boxes to operate without a dedicated IR receiver microcontroller, and provides expandability and flexibility above the physical layer.

BRIEF DESCRIPTION OF THE DRAWINGS

The present invention is described with reference to the accompanying drawings, wherein.

Identical reference numerals have been used to designate elements that are common to the figures.

DETAILED DESCRIPTION OF THE INVENTION

The invention will be primarily described within the context of an infrared (IR) receiver that receives IR signals such as a TEMIC™ TSOP1156 IR receiver. However, it will be appreciated by those skilled in the art that the invention is well suited to any system having a receiver capable of detecting 300 microsecond (usec) pulses, which are defined by six or more carrier cycles per pulse.

Figure 1:
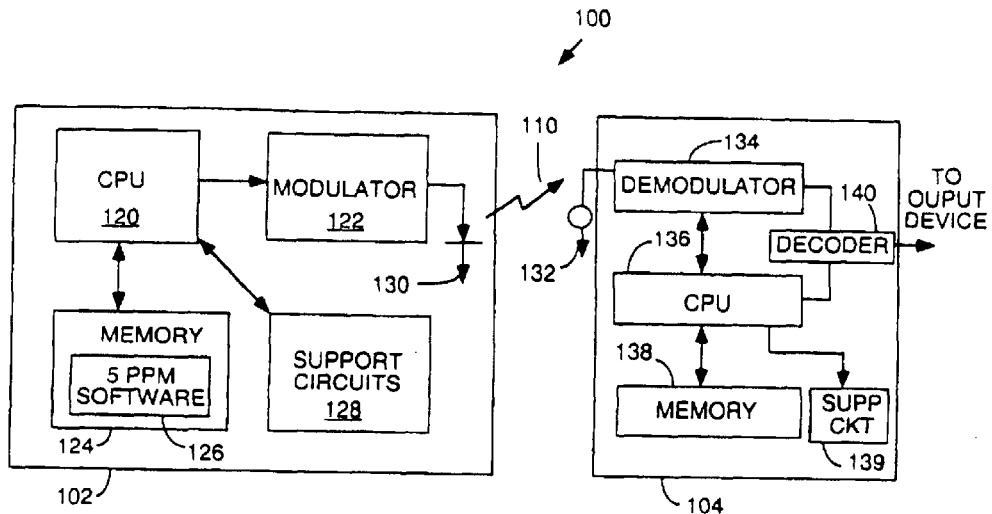
FIG. 1 illustrates an infrared (IR) signal receiver of the present invention.

FIG. 1 depicts an infrared (IR) signal receiver system 100. Specifically, a remote control device 102 transmits at least one IR signal packet 110 to an IR receiver 104. The remote control device 102 comprises a processing unit 120, memory 124, modulator 122, and support circuits 128 for collectively generating infrared pulsed for emission through a light emitting diode (LED) 130. In particular, each packetized IR signal 110 is generated via the remote control device 102 such as an IR keyboard or pointing device. The processing unit 120 of the remote control device 102 is capable of providing a stream of bits that are modulated by 5 pulse position modulation software 126 via the modulator 122. In a preferred embodiment, the carrier frequency is 56.875 KHz. The modulated IR s Signal is then transmitted via the LED 130 to IR receiver 104. The IR receiver comprises an IR port 132, demodulator 134, receiver processing unit 136, memory 138, support circuits 139, and a decoder 140. In particular, the IR packet is received by the IR port 132 for demodulation in the demodulator 134. The demodulated signal i.e., baseband signal is then processed by the receiver processing unit 136, memory 138, support circuits 139, and decoder 140, and then displayed on an output device such as a monitor (not shown) coupled to the IR receiver 104.

Figure 2:
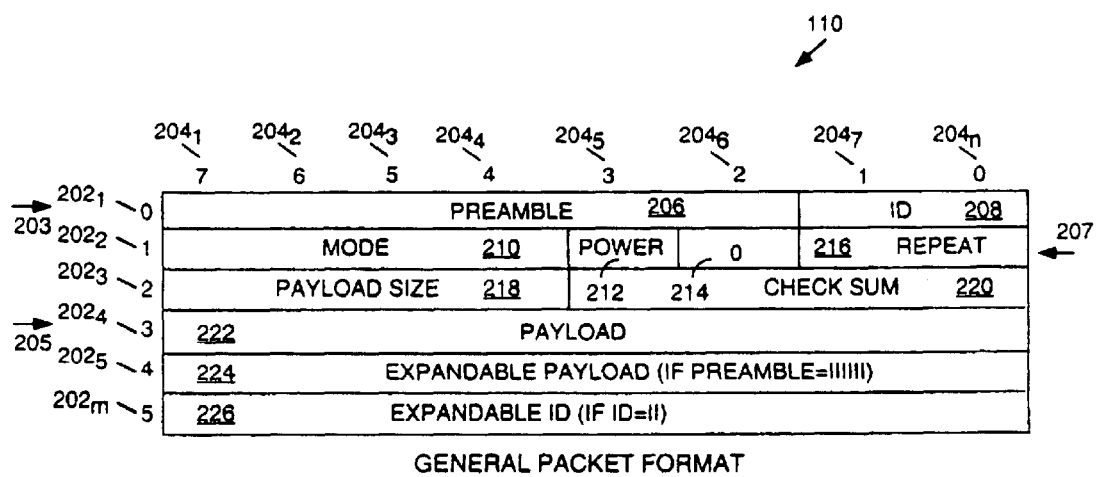
FIG. 2 illustrates a general packet format for an infrared signal protocol in accordance with the present invention.

FIG. 2 depicts a general packet format for an infrared signal protocol of the present invention. In particular, the IR signaling protocol is an expanded packet protocol that is transmitted in a packet 110 of bytes $202_1$ through $202_m$ (collectively bytes 202), where each byte 202 has n-bits $204_1$ through $204_n$ (collectively 8-bits 204). In the preferred embodiment, each byte 202 comprises 8 bits 204. The packet 110 further comprises a header portion 203 and a payload portion 205. The header portion 203 is defined in the first three bytes $202_{1-3}$ and the payload portion 205 is defined by remaining bytes $202_{4-m}$. In general, the header portion 203 comprises information to define the characteristics of the payload portion 205, route the packet 110, and perform error checking. The header portion 203 is a fixed length to allow a decoder (not shown) of an IR receiver 104 to find and translate the header portion 203. The payload portion 205 comprises information defined by a user such as a keyboard character or pointing device direction, and is variable in length.

In particular, the header portion 203 comprises a plurality of fields 207 including a preamble 206, ID 208, mode 210, power flag 212, reserved bit 214, repeat 216, payload size 218, and a checksum 220. The packet is transmitted from the most significant bit (MSB) and for purposes of discussion herein, the plurality of fields 207 will be discussed in order beginning with the MSB of each byte 202. The preamble 206 is designated as the first 6 bits 204 of the first byte 202. The purpose of the preamble 206 is to specify a target device for IR reception. Such targets illustratively include a television, video cassette recorder, AM/FM, camcorder, auxiliary, phono, tape, CD, satellite/cable, ASCII terminal, and the like. The traditional IR preamble is 4 bits wide, however the preamble 206 of the present embodiment adds two additional bits for a total of 6 bits, thereby allowing for greater device selection. Further extension of the preamble 206 is also possible by enabling preamble expansion capabilities. This is accomplished by setting the 6 bits in the preamble 206 "high". When all the preamble bits are set high, the payload portion 205 is extended an extra byte (i.e., expandable payload $102_5$) making the preamble 206 an 8-bit field. Thus, the devices available for selection is increased from 63 devices to 256 devices.

The ID field 208 is set forth as the least significant bits (LSB) $204_{7-8}$ in the first byte $202_1$. The ID field 208 is an identification field that is user programmable and provides support for several devices to operate in close vicinity. For example, if a game is supported with multiple input devices, by setting the ID field 208, an IR receiver may differentiate one keyboard from another. Two bits are allotted to the ID field 208 because if an excessive number of devices are used simultaneously in close vicinity, their respective signals may destructively interfere with each other. In order to overcome this problem, the present embodiment allows for the ID field 208 to be expanded in the payload portion 205 in a similar manner as the preamble 206. Specifically, both bits $204_7$ and $204_8$ are set high, and an extra byte 202 is added to the payload portion 205. If the preamble 206 is not expanded, then the expanded byte for the ID field 208 is the fifth byte $202_5$. However, if the preamble field 206 is also expanded, then the expanded ID field follows the expanded preamble field as the sixth byte $204_6$. Thus, in an expanded condition, the ID field 208 is capable of providing a possibility of 256 devices.

The second byte $202_2$ of the header portion 203 comprises a second portion of the plurality of fields 207. The mode field 210 comprises four bits $204_{1-4}$ and is utilized to set the payload type. Such modes include designations for a keyboard, basic pointing device, a precision pointing device, and the like. Such designations typically include mode 1 as the keyboard, mode 2 as the pointing device, and mode 3 as the precision pointing device. The mode field 210 allows a decoder in an IR receiver to route a packet without completely decoding the payload. The power field 212 is the fifth most significant bit $204_5$ of the second byte $202_2$. The power bit 212 is a flag that is set when a power source, such as a battery, in the transmitter of the keyboard or pointing device is below an acceptable operating level. Thus, the power bit 212 alerts a user that there is reduced range or an increase in the bit error rate (BER) due to low power. A reserved bit 214, which is the sixth bit $204_6$ in the second byte $202_2$, is held constantly low, and is reserved for future use.

The repeat field 216 is defined by the remaining least significant bits $204_{7-8}$ of the second byte $202_2$. The repeat field 216 is a power saving tool and may be used for a transmitting device (e.g., keyboard/mouse) to indicate first presses of a button. In the preferred embodiment, if the repeat field bits are set to 01, the bits $204_{7-8}$ indicate a first transmission of a character from a keyboard or direction from a pointing device. If the repeat field bits are set to 11, the bits $204_{7-8}$ indicate that a shortened repeat sequence is transmitted instead of a full packet payload. Conversely, if bits $204_{7-8}$ are set to either 00 or 10, then the repeat field 216 is ignored, and a fill packet payload is transmitted. The shortened packet includes in the header fields 207, the preamble 206, ID 208, mode 210, a two-bit checksum 220 and the repeat field 216 set to 1 and 0. The remaining portion of the packet 110 is excluded unless the expanded preamble 224 and/or expanded Id 226 are set. Thus, the effective number of bits transmitted (without the expansion fields) is 16, versus 40 for the typical keyboard packet.

The third byte $202_3$ of the header portion 203 comprises the payload size field 218 located in the first 4 most significant bits, and the checksum 220 in the remaining four bits. The payload size field 218 stores the number of bytes in the payload portion 205. As previously discussed, the payload portion 205 of the packet 110 is variable in length. The payload size field 218 provides the decoder in the IR receiver with the exact payload size, and thereby eliminates the need for the decoder to make such calculations. If either the preamble and/or the ID fields 206 and/or 208 are in an expansion mode, then the payload size field 218 accounts for the increased bit count. The checksum field 220 is utilized to verify data integrity. When all the nibbles (i.e., 4 bits of a byte) of a packet 110 are added together, including the checksum 220, the result should be zero when the carry is ignored. In an instance where the checksum is not a zero value, then a bit error has occurred and the packet must be retransmitted.

The plurality of fields 207 of the header portion 203 for the infrared signal protocol format is the same regardless of the type of infrared device. In contrast, the payload portion 205 of the packet 110 varies according to the type of device. The fourth byte $202_4$ represents the payload 222 and is present in each packet 110 unless the 15 repeat field 216 has both bits set high. The fifth and sixth bytes $202_5$ and $202_6$ are included in the payload portion 205 of the packet 110 only in the select circumstances discussed above.

Figure 3:
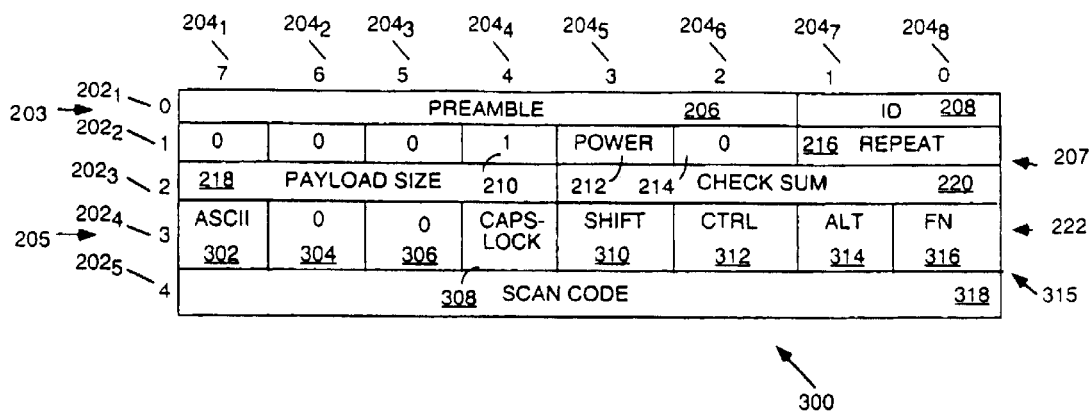
FIG. 3 illustrates an IR signaling protocol defining a packet for a keyboard device in accordance with the present invention.
Figure 4:
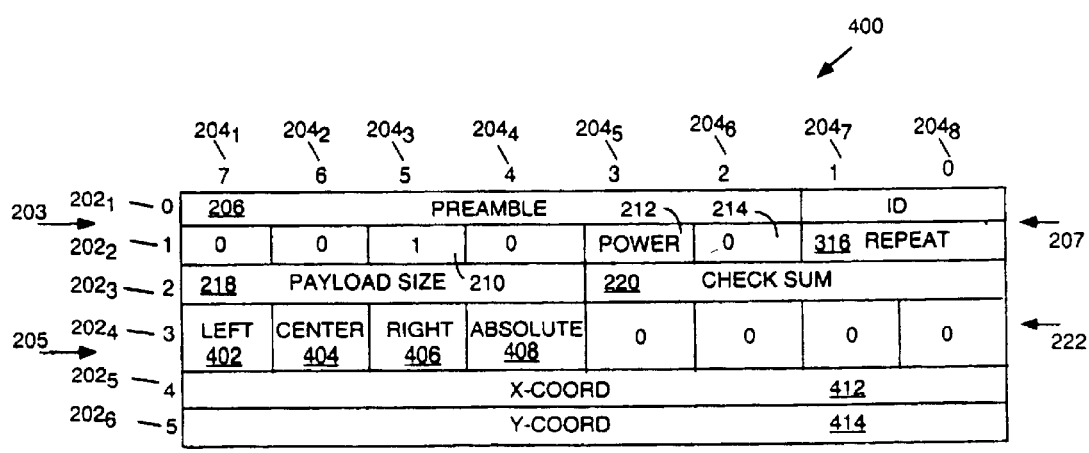
FIG. 4 illustrates an IR signaling protocol defining a packet for a pointing device in accordance with the present invention.

FIGS. 3–4 each depict an IR signaling protocol defining a packet format for a specific device. Each IR signaling protocol follows the embodiment as described in FIG. 2. In particular, FIG. 3 depicts an IR signaling protocol defining a packet 300 for a keyboard device. The IR signaling protocol for the keyboard comprises the three-byte header portion 203 having the plurality of fields 207 and the payload portion 205 as shown in the general format embodiment. In this instance, the mode field 210 has the least significant bit $204_4$ set high and the remaining bits $204_{1-3}$ set low to signify a keyboard device. The payload portion 205 is defined by two bytes $202_4$ and $202_5$. Furthermore, each bit of the payload field 222 represents a specific keyboard function. Specifically, the payload field 222 comprises an ASCII flag 302 in bit $204_1$ and a plurality of key flags 315 including a CAPS-LOCK flag 308 in bit $204_4$, a Shift flag 310 in bit $204_5$, a Control (CTRL) flag 312 in bit $204_6$, an ALT flag 314 in bit $204_7$, and a Function flag (FN) 316 in bit $204_8$. The two non-designated flags 304 and 306 in bits $204_2$ and $204_3$ are reserved for future requirements and are kept in a low state. The ASCII flag 302 is used in conjunction with the keyboard payload. That is, when the ASCII flag bit 302 is set high, a specific 8-bit scan code from a key selected by a user on a keyboard is set in a scan code filed 318. The scan code field 318 is defined by a fifth byte $204_5$. The scan codes for a keyboard are based upon an IBM™ standard or enhanced keyboards that have a unique hexadecimal value for each character and key on a keyboard. For example, a non-capitalized letter "g" is 0×67, and a capital "K" is 0×4B in hexadecimal notation. The hexadecimal values are converted into binary numbers. The binary numbers are then set in the scan code field 318, i.e., fifth byte $202_5$, of the payload portion 205 of the packet 300. Thus, if a user were to depress the capitalized K, then the binary equivalent of 0100 1011 would be set in the scan code field 318. Furthermore, the Shift flag bit 310 would be set high.

When the ASCII flag 302 is set low, then the scan code 318 may represent any other non-keyboard selection. In an instance where an IR keyboard is linked to a set-top box, the scan code 318 may represent service provider information such as guide, menu, mail, search, and the like, or control functions such as forward, reverse, play, go to, pause, channel, and the like. The plurality of key flags 315 are set high whenever the Shift 310, CTRL 312, ALT 314, and/or FN 316 keys are depressed on a keyboard by a user. These flags 315 are independent of the scan codes and each other. Therefore, when the ASCII bit 302 is set low, the primary purpose of the key flags 315 is to provide support for non-ASCII key combinations. For example, if CTRL+MENU combination is detected, the CTRL flag 312 is set high and the MENU character is sent as a service provider selection.

In this manner, each packet 300 represents a character or command selected on a keyboard by a user. Accordingly, as a user types in real time, the packets 300 are sequentially sent from the keyboard device to the IR receiver 104 for decoding.

FIG. 4 depicts an IR signaling protocol defining a packet 400 for a pointing device. The IR signaling protocol for the pointing device comprises the three-byte header portion 203 having the plurality of fields 207 and the payload portion 205 as shown in the general format embodiment of FIG 2. In this instance, the mode field 210 has the third MSB $204_3$ set high and the remaining bits $204_{1-2}$ and $204_4$ set low to signify a standard pointing device. The payload portion 205 is defined by three bytes $202_{4-6}$. Furthermore, the first four most significant bits $204_{1-4}$ of the payload field 222 (fourth byte $102_4$) represent a specific pointing device function. Specifically, a Left field 402, Center field 404, and Right field 406 are bits that are set high to represent a left, center, or right button on a pointing device when such button is depressed. In an instance where all pointer buttons are released and no other pointer device is operated, a single zero-value pointer packet is transmitted. Such zero-value signal generates a "button-up" message in the IR receiver. Additionally, the remaining four bits $204_{5-8}$ of the payload portion 205 are reserved for future use and set in a low state.

Transmitted coordinates for a pointing device represent a delta from a fixed location. If the coordinates are absolute with respect to a point, then the bit in the absolute field 408 is set high. Conversely, if the delta is relative to a previous transmission, then the coordinates are relative and the bit in the absolute field 408 is set low. The transmitted coordinates are X and Y coordinates 412 and 414, which are represented by the fifth byte $102_5$ and sixth byte $102_6$, respectively. Positive numbers, such as 0×7F=+127, and 0×01=+1, represent movements left or up and a negative numbers such as 0×FF=−1, 0×80=−128, represent movements right or down. In this manner, each packet 400 represents a numerical value to define movement and/or a button as selected on a pointing device by a user. Accordingly, as a user moves the pointing device in real time, a plurality of packets 400 are sequentially sent from the pointing device to the IR receiver for decoding.

The IR signaling protocol is designed in compliance with the Open Systems Interconnection (OSI) standards and the Infrared Data Association (IrDA). Specifically, point-to-point communications between the IR devices utilize half duplex serial IR communications links through free space. As discussed previously, each packet is transmitted serially, starting with the most significant bit. In order to overcome the deficiencies of utilizing 4 pulse position modulation (4 PPM), the inventive protocol is transmitted via a 5 pulse position modulation (5 PPM) technique, where the last pulse position is empty. The following Table 2 correlates each data bit pair with a corresponding 5 PPM data symbol.

TABLE 2

| Data Bit Pair (DBP) | 5 PPM Data Symbol |
| --- | --- |
| 00 | 10000 |
| 01 | 01000 |
| 10 | 00100 |
| 11 | 00010 |

Logical "1" represents a chip duration when the transmitting LED is emitting light, while a logical "0" represents a chip duration when the LED is off In this manner, a packet containing illustratively 40 bits representing a letter, number, or command selected by a user on the keyboard is represented by 20 symbols, modulated onto a carrier, and transmitted from a infrared serial port on the keyboard to the set-top box.

Figure 5:
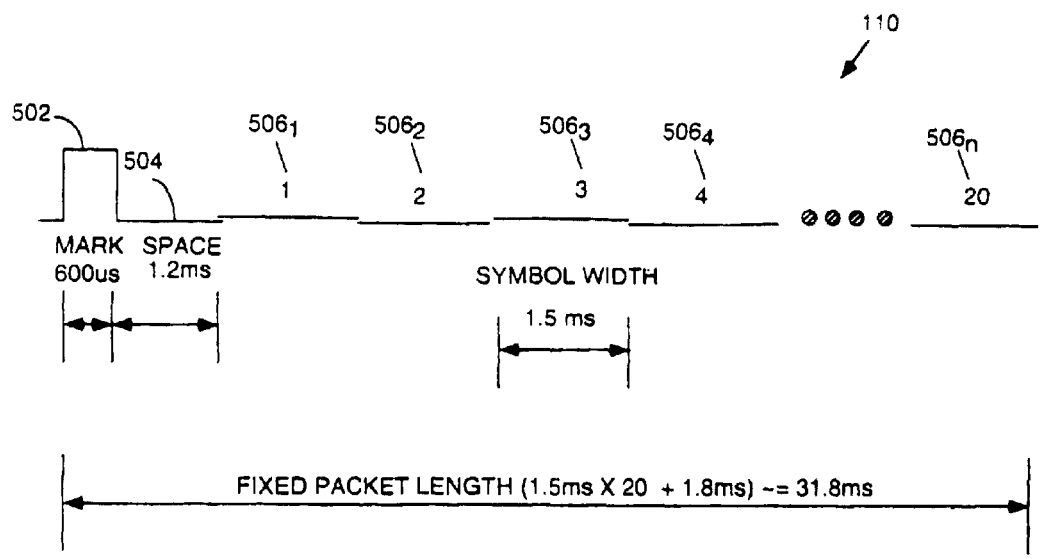
FIG. 5 illustrates a timing diagram of a packet in accordance with the present invention.

FIG. 5 depicts a timing diagram of a packet 110. The packet 110 comprises a mark 502, a space 504 and a plurality of symbols $506_{1-n}$ (collectively symbols 506). In a preferred embodiment, the mark 502 is 600 microseconds in length and is utilized to alert the decoder of an incoming packet. The space 504 follows the mark 502 and is 1.2 milliseconds long. Specifically, the mark 502 and space 504 are used in conjunction to set a correct amount of gain in the circuit so that the receiver can differentiate what is just random noise from the true signal. The remaining portion of the packet 110 is the plurality of symbols 506. In the preferred embodiment, the packet 110 comprises 20 symbols each representing two bits. Each symbol 506 has a period of 1.5 milliseconds. As such, the fixed packet length for a 40-bit packet 110 is 31.8 milliseconds.

Figure 6:
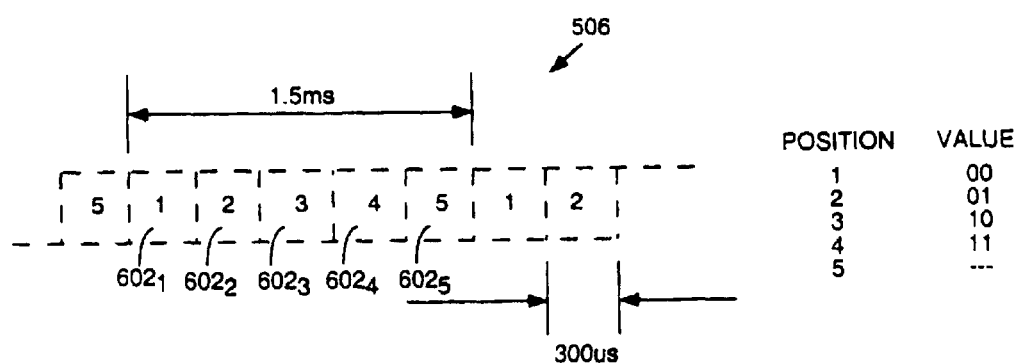
FIG. 6 illustrates a timing diagram of a symbol in accordance with the present invention.

FIG. 6 depicts a timing diagram of a symbol 506. Specifically, each symbol 506 is comprised of five equal time slots or "chips" $602_{1-5}$ (collectively chips 602), where each chip is a pulse position. Furthermore, only one of the five chip positions of each symbol 506 may contain IR modulation as disclosed by each 5 PPM data symbols in Table 2. For example, the data bit pair 01 has a 5 PPM data symbol of 01000 where the only high pulse is set in the second chip $602_2$. Furthermore, the fifth chip $602_5$ is always held low. One advantage of 5 PPM versus 4 PPM is that two IR pulses will never occur back to back. For instance, if the data pairs 11 and 00 are sequentially transmitted, then the pulses 00010 10000 would be sent under the 5 PPM technique, as opposed to 00011000 being sent under the 4 PPM technique. Under the 4 PPM scheme, a receiver must check the duration of the pulses to determine that the "11" pulse is actually comprised to two consecutive "1" pulses. However, under the 5 PPM scheme, the IR receiver knows that two consecutive "1" pulses will not occur. Accordingly, the IR receiver may process only the rising edges of the transmission, and have a fixed count of the number of edges in the transmission, as opposed to a varied amount (due to back-to-back pulses) under the 4 PPM technique. Each of the chips 602 has a fixed time length of 298.901 microseconds per pulse. The carrier frequency is 56.875 KHz. Therefore each pulse comprises 17 cycles per pulse and each symbol 506 is approximately 1.5 milliseconds in length, as discussed in FIG. 5.

In operation, the IR signaling protocols as depicted in FIGS. 1–4, are transmitted from the remote IR device 102 to a decoder of the IR receiver 104 as per the 5 PPM technique. Data encoding for transmission is performed by most significant bit first. The decoder searches for the 600 usec mark 502 and 1.2 msec space 504 to distinguish the inventive expanded packet format from a traditional IR format and set the required gain to overcome any random noise. Thereafter, the 3-byte header portion 203, beginning with the preamble 206 via symbols $506_{1-12}$, may be decoded. From the header portion 203 the size is determined from the payload size field 218 and then the payload portion 205 (transmitted in the remaining symbols $506_{13-n}$ of the packet 110) is decoded. In the instance where the device is a keyboard without utilizing expandable fields or repeating a packet, 40 bits, i.e., 20 symbols $506_{1-20}$ are transmitted and then decoded. Additional symbols are transmitted in instances where the expandable fields (bytes) are present. In the instance where the device is a pointing device, 48 bits, i.e., 24 symbols are transmitted and decoded.

Figure 7:
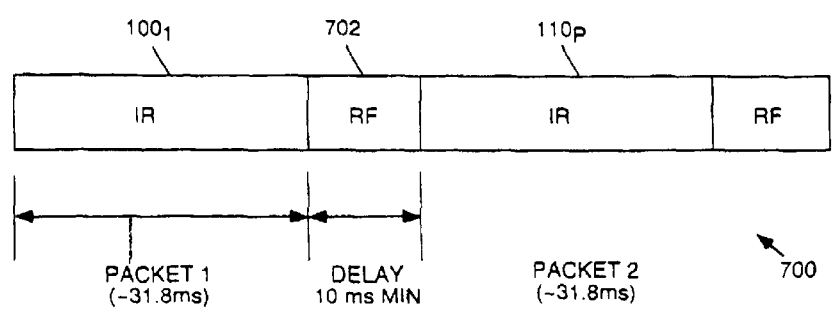
FIG. 7 illustrates a data stream of IR 5 PPM packetized information in accordance with the present invention.

FIG. 7 depicts a data stream of IR 5 PPM packetized information 700. In particular, the data steam 700 comprises a plurality of packets $110_1$ through $110_p$ (collectively packets 110) and a minimum interval 702 of 10 milliseconds between each of the packets 110. The minimum 10 msec interval 702 allows for transmission of a radio frequency (RF) pulse during this time. A person skilled in the art will recognize the interval 702 may be a longer period, however such increased time is at the expense of throughput. RF pulses may be transmitted to a receiver by other RF devices such as in a Direct Satellite System (DSS) and the like. In this manner, both IR and RF formats may co-exist, thereby enabling a user to transmit both IR and RF signals using one remote device.

It should be apparent to those skilled in the art that a novel method and apparatus for an infrared signaling protocol having a header and expandable payload has been provided. Such IR signaling protocol is transmitted from an IR keyboard or pointing device to an IR receiver as a sequence of symbols using 5 pulse position modulation. Although various embodiments that incorporate the teachings of the present invention have been shown and described in detail herein, those skilled in the art can readily devise many other varied embodiments that still incorporate these teachings.

What is claimed is:

1. A signaling apparatus, comprising:
    data input means for receiving user input;
    a memory having signaling data stored therein;
    a processor, coupled to the memory and the data input means, for generating a signal sequence in response to a user input, the signal sequence comprising 5 pulse position modulated (5 PPM) signals, the last position of each said 5 PPM being always set to a low bit;
    a modulator, coupled to the processor, for modulating the signal sequence onto a carrier signal;
    a transmitter, coupled to the modulator, for transmitting the modulated signal sequence, including the 5 pulse position modulated signals.

2. The apparatus of claim 1, wherein said signal sequence is defined by a signaling protocol having a header portion and a payload portion.

3. The apparatus of claim 2, wherein said header portion comprises a plurality of fields for defining said payload portion.

4. The apparatus of claim 2, wherein said payload portion is a variable bit stream.

5. The apparatus of claim 1, wherein said data input means comprises a keyboard.

6. The apparatus of claim 1, wherein said signal sequence defines a position on a display of an image display device.

7. In a control system having a signal transmitter for encoding and transmitting control signals and a signal receiver for receiving and decoding the control signals, the receiver comprising means for decoding a control signal in response to rising edges of pulses in the control signal, a control signal structure comprising:

a payload portion; and a header portion, said header portion comprising a plurality of fields for defining said payload portion, said header and payload portions being represented as a plurality of symbols encoded in accordance with a 5 pulse position modulation (5 PPM) scheme, wherein each of said encoded symbols includes a last position that is always set to a low bit.

8. The data structure of claim 7, wherein said payload portion indicates a keyboard character.

9. The data structure of claim 7, wherein said payload portion indicates coordinates for a pointing device.

10. The apparatus of claim 7, wherein said header portion comprises a repeat field for selectively transmitting only said header portion.

11. In a control system having a signal transmitter for encoding and transmitting control signals and a signal receiver for receiving and decoding the control signals, the receiver comprising means for decoding a control signal in response to rising edge of pulses in the control signal, a method of providing control signals, comprising:

generating a signal sequence in response to a user input; and converting said signal sequence into a plurality of symbols in accordance with a 5 pulse position modulated (5 PPM) scheme, wherein said converting step comprises setting a last position of each said 5 PPM symbol to a low bit.

12. The method of claim 11, further comprising the step of defining said symbol sequence by a signaling protocol having a header portion and a payload portion.

13. The method of claim 11, further comprising the step of sending bits representing a keyboard character as said payload portion.

14. The method of claim 11, further comprising the step of sending bits representing a coordinate for a pointing device as said payload portion.

\* \* \* \* \*